United States Patent [19]
Esbroeck et al.

[11] Patent Number: 5,167,568
[45] Date of Patent: Dec. 1, 1992

[54] DEVICE AND INSTALLATION FOR SELECTIVELY REMOVING ORGANS FROM A SLAUGHTERED ANIMAL

[75] Inventors: Maurice E. T. Esbroeck, Nijmegen; Adrianus J. van den Nieuwelaar, Gemert, both of Netherlands

[73] Assignee: Stork PMT, Av Boxmeer, Netherlands

[21] Appl. No.: 794,451

[22] Filed: Nov. 19, 1991

[30] Foreign Application Priority Data

Nov. 22, 1990 [NL] Netherlands ............... 9002551

[51] Int. Cl.⁵ ............... A22C 21/06; A22C 25/16
[52] U.S. Cl. ............... 452/116; 452/117; 452/120; 452/122
[58] Field of Search ............ 452/116, 109, 106, 117, 452/120, 122

[56] References Cited

U.S. PATENT DOCUMENTS

| | | | |
|---|---|---|---|
| Re. 32,402 | 4/1987 | Graham et al. | 452/117 |
| 4,004,320 | 1/1977 | Scheier et al. | 452/116 |
| 4,704,768 | 11/1987 | Hutting et al. | 452/106 |
| 4,910,829 | 3/1990 | Simmons | 452/116 |
| 4,918,787 | 4/1990 | Hazenbroek | 452/116 |

Primary Examiner—Willis Little
Attorney, Agent, or Firm—Hurt, Richardson, Garner, Todd & Cadenhead

[57] ABSTRACT

A device for removing one or more organs or parts thereof from a slaughtered animal, in particular a bird, comprising: an organ guide device with an open organ feed end to be inserted temporarily into the slaughtered animal; an organ conveyance device for removing organs or parts thereof along the organ guide device; a separating device which is fitted near the organ feed end or along the organ guide device for making a separation in organs or connecting tissue between them at a predetermined place; and a device for establishing the position of the organs relative to the separating device. The device for establishing the position of organs may be fitted at the open organ feed end of the organ guide device and may comprise an organ feed aperture with such dimensions that first organs can pass said aperture and second organs connected to the first organs cannot pass said aperture. An installation comprises a plurality of the organ removal devices (150) for processing slaughtered animals which are being moved along in a conveyor, and which are hanging by the legs in hooks.

18 Claims, 7 Drawing Sheets

_Fig. 5._

_Fig. 6._

DEVICE AND INSTALLATION FOR SELECTIVELY REMOVING ORGANS FROM A SLAUGHTERED ANIMAL

BACKGROUND OF THE INVENTION

This invention relates to a device for removing one or more organs or parts thereof from a slaughtered animal, in particular a bird, comprising organ guide means with an open organ feed end to be inserted temporarily into the slaughtered animal, and also organ conveyance means for removing organs or parts thereof along the organ guide means. The invention also relates to an installation comprising said device. The term "organ" here refers to body structures having specific functions, like intestines, stomach, heart, lungs, liver, etc., and does not refer to any connecting tissue, fat tissue, etc.

DISCUSSION OF THE PRIOR ART

Devices for removing organs from a slaughtered bird are known, e.g. from US-A-4,024,603 and US-A-4,114,239, which both disclose an elongated vacuum lung removal apparatus. For this purpose, a hollow tubular member having at one end thereof an aperture, with said end is inserted into a slaughtered eviscerated bird, following which the lungs are sucked out of the body cavity of the bird by applying vacuum to the interior of the tubular member. Ambient air is allowed to enter the body cavity during removal of the lungs to maintain an air flow in the tubular member.

These known devices are non-selective, i.e. it is principally impossible to completely avoid other internal body parts, e.g. kidneys, than the intended organs from being withdrawn also from the body cavity Other devices for removing organs or parts thereof from a slaughtered animal are also known and are used, for example, for obtaining slaughtered animals from which the intestines have been removed, but in which the remainder of the viscera—comprising heart, lungs, liver etc.—is present still intact and virtually in the natural position. The removal of the intestines takes place by first making an incision around the vent with a cutter, following which the vent with the intestines connected thereto is sucked in an extended position out of the slaughtered animal through a hollow mandrel by means of a vacuum source, which mandrel for this purpose is provided with an intestine feed aperture at an end to be inserted into the slaughtered animal. The internal dimensions of the hollow mandrel and the dimensions of the aperture thereof are greater than the transverse dimensions of the intestines, but smaller than the transverse dimensions of the stomach situated at the end of the intestines facing away from the vent, so that suction of the intestines stops as soon as the stomach reaches the mandrel aperture of the device. By exerting a great enough suction force on the intestines, it is then possible to make the intestines break off near the stomach.

A disadvantage of the last-mentioned device and the method used is that the break of the intestines occurs at a place which cannot be predetermined, so that after the withdrawal of the mandrel from the slaughtered animal some of the contents of the intestines can fall into the belly cavity of the slaughtered animal, and from a hygienic point of view can cause very undesirable bacteriological contamination there.

Another disadvantage of the known device is the risk that the air flow in the mandrel will be discontinued at least partially after the stomach has reached the mandrel aperture during the extraction of the intestines and fully or partially shuts off said aperture. First of all, in this situation insufficient suction force can be exerted on the intestines to make them break off, with the result that the device does not fulfill its purpose. Secondly, in this situation the stomach undergoes great forces locally, as a result of the abnormally high pressure difference between the inside and outside of the mandrel, with the result that the stomach can tear and stomach contents left behind can fall into the belly cavity of the slaughtered animal. A thorough cleaning of the belly cavity is then necessary.

A further disadvantage of the known device is that it is in principle unsuitable for selectively removing organs other than the intestines.

SUMMARY OF THE INVENTION

The object of the invention is to eliminate the above-mentioned disadvantages and to widen the field of application of the device considerably, and to this end the invention provides an organ removal device, comprising separating means which are fitted near the organ feed end or along the organ guide means for making a separation in organs or connecting tissue between them at a predetermined place; and means for establishing the position of the organs relative to the separating means. The means for establishing the position of the organs may take many forms, mostly but not necessarily depending on the implementation of the organ conveyance means. Such forms include means for measuring mechanical forces, pressure, contours of organs, time, etc.

With these measures it is possible in the first place for the device discussed above for removal of the intestines from a slaughtered animal to separate the intestines from the stomach with certainty at an accurately predetermined place, so that bacteriological contamination of the slaughtered animal through escaping intestine contents can be prevented. For this purpose, near the feed aperture of the hollow mandrel a cutter can be provided, which cutter can be operated when a sudden pressure drop in the mandrel indicates that the stomach has reached and closed the feed aperture. Through the fact that the separating means according to the invention thus can separate the intestines from the stomach as close up as possible, this separation takes place in vacuum conditions in a region with a low pH where the germ count is low. Moreover, the separation of the intestines takes place entirely inside the mandrel, and the intestines are discharged directly through the mandrel, so that any intestine contents escaping from the intestines cannot reach the belly cavity of the slaughtered animal.

In a wider context, the use of the device according to the invention is no longer limited, however, to the removal of intestines alone from the slaughtered animal, nor is it limited to the use of a hollow mandrel or a vacuum source. Now, also a—possibly mechanised—selective removal of other organs such as liver, heart and lungs or parts thereof is possible, which means a great improvement over the state of the art in this field, since it was customary hitherto to remove the viscera as a whole from the slaughtered animal and then to convey these to various devices designed to separate them and extract specific organs. With the device according to the invention, the organs to be extracted, or parts thereof, can be selectively removed immediately from the belly cavity of the slaughtered animal, with the result that a large number of machines for carrying out specific operations on a package of organs or a part thereof are made redundant.

The organ guide means and the conveyance means can be designed in many different ways. Apart from the embodiment already mentioned, which comprises a hollow mandrel and an air flow produced by a vacuum source, the organs can also be displaced by mechanical means acting directly on the organs, for example by means of one or more conveyor belts.

The separating means can comprise shearing means, cutting means or pinch-off means. The separating means can also be laser beams or water jets, or means for burning through tissue, all of which are known per se.

Preference is given to means for establishing the position of organs which are fitted at the open organ feed end of the organ guide means and comprise an organ feed aperture with such dimensions that first organs can pass said aperture, and second organs connected to the first organs: cannot pass said aperture. With the separating means provided near the organ feed aperture, in this case the first organs can be separated from the second organs at a predetermined place for the selective removal of the first organs.

A preferred embodiment of the invention comprises passing means for setting the dimensions of the organ feed aperture, which passing means comprise, for example, an iris diaphragm. As is known, the lamellae of such a diaphragm can hinge jointly for setting the dimensions of the diaphragm aperture, and organs with different dimensions can therefore be retained by setting the aperture. It should be pointed out that an iris diaphragm can act not only as a passing means, but concurrently as a separating means, for example if the lamellae are provided with cutting edges.

In another preferred embodiment, the organ guide means comprise a number of separating means placed one after the other at predetermined distances in the direction of removal of the organs. Through suitable positioning of the separating means, a number of organs situated one after the other along the organ guide means can be extracted one after the other selectively and, unlike the situation in which only one separating means is present, there is no need to set the position of the organs to be removed relative to said one separating means.

In another preferred embodiment, the organ guide means comprise a number of sets of organ feed apertures and separating means placed one after the other at predetermined distances in the direction of removal of the organs. This embodiment permits better positioning of organs lying one after the other along the organ guide means through the use of sets of organ feed apertures and separating means placed in series one after the other, so that of two organs lying one after the other, and to be separated from each other, the organ closest to an organ feed aperture can be retained by passing means interacting with the organ feed aperture and can thus be positioned, and the separating means lying behind the organ feed aperture can carry out a separation at a place which can be predetermined particularly accurately.

It is advantageous to convey the organs in a hollow mandrel by means of an air flow produced by a vacuum source and directed from an organ feed aperture into the mandrel, provision being made for channels of which one open end opens out outside the slaughtered animal and the other open end opens out in the mandrel near the aperture thereof. Thanks to the provision of the channels, an air flow is present in the mandrel at all times, even if the organ feed aperture is shut off completely by an organ. The pressure difference over the organ shutting off the aperture and the forces exerted on the organ also remain limited in this way.

In another embodiment of the invention, the separating means comprise an elongated cutting element which pivots about a line parallel to the central axis of the organ guide means. The implementation of the operation of such a cutting element can be made very simple.

In the case of a cylindrical surface shaped mandrel it is preferable to have separating means comprising a first and a second cutting element which extend essentially from the inside wall of the mandrel in the radial direction at least up to the axis of the mandrel and directly adjoin each other in the axial direction, each of them shutting off a part of the cross-section of the hollow space inside the mandrel and being capable of pivoting relative to each other about the central axis of the mandrel. If the two cutting elements lie above one another in the axial direction an organ or connecting tissue between organs can be positioned in the remaining cross-section of the space inside the mandrel. If the two cutting elements are then rotated relative to each other, the cross-section of the hollow space in which the organ or connecting tissue lies decreases, causing a cutting operation to be carried out on the organ or the connecting tissue at the position of the contact face of the two cutting elements.

The envisaged pivoting action of the two cutting elements can be produced in an advantageous manner by fixing one of the two cutting elements to the mandrel and fixing the other cutting element to a bush which is rotatable coaxially inside the mandrel.

In another advantageous embodiment the separating means comprise a bow-shaped cutting element extending along a part of the mandrel between two pivot points lying essentially diametrically opposite each other, and pivotable about a line through the pivot points at right angles to the central axis of the mandrel. This cutting element can be rotated from an initial position along the inner periphery of the mandrel through an angle of approx. 180° and thus cut through an organ or tissue lying in the path of the cutting element.

In an advantageous development of this cutting principle, two bow-shaped cutting elements are fitted diametrically opposite each other in the mandrel, the respective pivot points of said cutting elements coinciding or lying adjacent to each other. The envisaged cutting action can be obtained by moving the two cutting elements from an initial position, in which they lie along the inner periphery of the mandrel and therefore do not prevent organs from passing, through an angle of approx. 90° towards each other, the cutting edges of the cutting elements facing each other.

In a preferred embodiment of the invention, the organ feed end is provided with an annular cutting edge operative in the axial direction, and at least the organ feed end of the organ guide means can be driven rotatably. Such organ guide means extend the functions described above over those generally known from a vent cutter.

In another embodiment, the vent cutting function is achieved by providing coaxially outside the organ guide means a cutter which is movable in the axial direction relative to the organ feed end and can be driven rotatably, and which has an annular cutting edge operative in the axial direction. This cutter can be taken into an operational position at the moment when an incision has to be made around the vent and, after the incision has been made, can be retracted behind the organ feed end. When organs are subsequently moved by the organ conveyance means along the organ guide means, the risk of the organs being damaged by the cutting edge of the vent cutter is thus avoided.

The effectiveness of the cutting edge can be increased by providing said cutting edge with a number of radial notches provided at an acute angle to the central axis of the organ guide means, the side of each notch which forms an obtuse angle with the cutting edge lying in the direction of rotation of the cutting edge.

For use of the device according to the invention in a mechanised slaughter line, it is advantageous to incorporate a number of such devices in an installation which is disposed along a conveyor in which the slaughtered animals are being moved along hanging by the legs in hooks, which installation comprises a fixed, essentially cylindrical drum, in the outer surface of which curved tracks are provided for controlling, by means of follow-on wheels guided in the curved tracks, the movement of the organ guide means, the organ conveyance means, the separating means and the passing means of devices to be rotated around the drum, the peripheral speed of the devices being essentially equal to the conveyance speed of the conveyor.

The claims and advantages will be more readily appreciated as the same becomes better understood by reference to the following detailed description and considered in connection with the accompanying drawings in which like reference symbols designate like parts. In the drawings many constructional elements which are not essential to the invention or the understanding thereof are not shown for clarity.

BRIEF DESCRIPTION OF THE DRAWINGS

FIG. 9b shows a transverse cross-section of a part of the device of FIG. 9a, showing a cutter;

FIG. 9c shows a longitudinal cross-section of another part of the device of FIG. 9a;

FIG. 10b shows a transverse cross-section of a part of the device of FIG. 10a, showing two cutters;

FIG. 10c shows a longitudinal cross-section of another part of the device of FIG. 10a;

DESCRIPTION OF THE PREFERRED EMBODIMENTS

Figure 1:
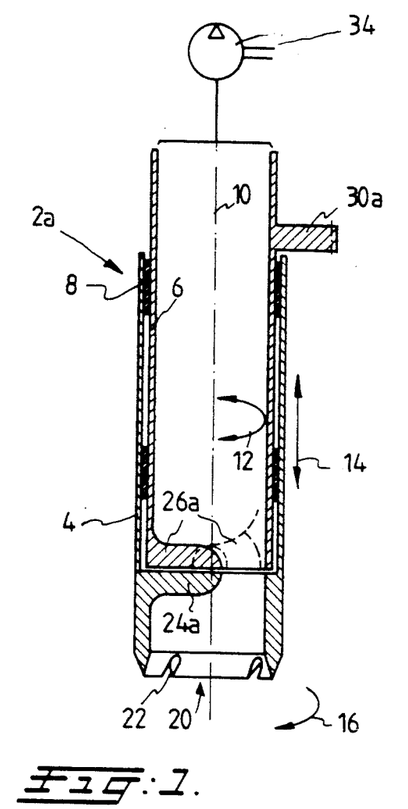
FIG. 1 shows a cross-section of a part of the device according to the invention, in a first embodiment, in longitudinal view.
Figure 3:
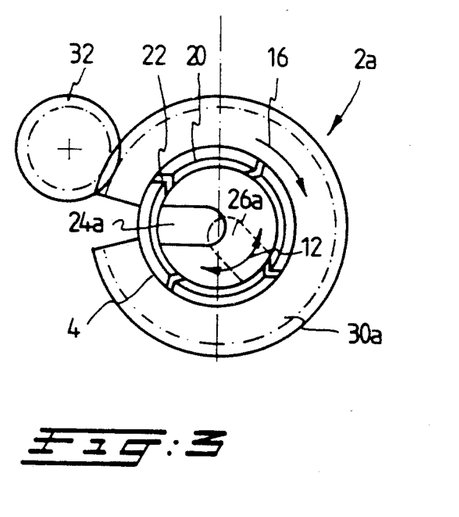
FIG. 3 shows a bottom view of the device according to FIG. 1.

FIGS. and 3 show a cylindrical surface shaped mandrel 2a, which is made up of a mandrel jacket 4 and a bush 6 provided coaxially inside the mandrel jacket 4. The bush 6 is rotatable about the axis 10 of the mandrel 2a by means of bearings 8 through an angle of about 340° relative to the mandrel jacket 4, the rotatability being symbolically indicated by a double arrow 12. The mandrel jacket 4 and the bush 6 can be moved by means not shown in the axial direction in a fixed position relative to each other, which is indicated symbolically by a double arrow 14. Finally, it is possible to rotate the combination of mandrel jacket 4 and bush 6 about the axis 10 in the direction of an arrow 16.

The organ feed end of the mandrel jacket 4 is provided with a cutting edge 20 with four radial notches 22 provided at an acute angle relative to the axis 10. The mandrel jacket 4 has a cutting element 24a projecting in the radial direction from the inside wall thereof. The bush 6 also has a cutting element 26a projecting in the radial direction from the inside wall thereof, said element being shown in two different positions, one of which is shown by dashed lines. These positions are obtained by rotating the bush 6 relative to the mandrel casing 4, for which purpose the bush 6 is provided with a toothed collar 30a, in which a driven toothed wheel 32 meshes.

The space inside the mandrel 2a can be placed under vacuum relative to the environment by pumping the air out of it, using a symbolically shown pump 34.

The device shown in FIGS. 1 and 3 operates as follows. The mandrel 2a rotating in the direction of arrow 16, in which mandrel a vacuum is created by means of the pump 34, is moved centred around the vent of a slaughtered animal, in the direction of the vent, where the cutting edge 20 with the notches 22 will make an incision around the vent. In this stage of the operation the projections 24a and 26a are in line with each other, viewed in the axial direction, with the result that most part of the passage inside the mandrel 2a is open.

When the vent has been cut out, the rotation in the direction of the arrow 16 is stopped, and the vent with the intestines connected thereto is sucked by the vacuum out of the belly cavity of the slaughtered animal through the organ feed end into the mandrel. The intestines can pass the rounded projections 24a and 26a without any problems and are extracted, for example, to a collection space. An air flow which promotes the conveyance in the mandrel 2a is supported through the fact that air can be sucked through the gap between the mandrel casing 4 and the bush 6, for which purpose axial apertures are provided in the bearings 8.

The suction of the intestines into the mandrel 2a continues until the stomach connected to the intestines reaches the organ feed aperture or suction aperture of the mandrel. The suction aperture in this case has such dimensions that the stomach cannot pass this aperture, with the result that the conveyance of the intestines in the mandrel 2a stops. In this stage of the processing the bush 6 inside the mandrel jacket 4 is turned according to the arrow 12 in one of the directions indicated through an angle of about 340°, so that the intestines are cut from the stomach at a predetermined place defined by the axial distance between the suction aperture and the cutting plane between projections 24a and 26a, and are sucked further into the mandrel. The moment for cutting off the intestines can be determined by the expiration of a predetermined time period sufficient for ensuring a complete removal of the intestines from the body cavity of the slaughtered animal, or can be determined more accurately and more efficiently by sensing the pressure inside the bush 6, where a sudden drop of pressure will indicate that the suction aperture is closed off by the stomach and cutting may take place.

During the suction of the intestines into the mandrel described above, the suction aperture of the mandrel remains situated in the slaughtered animal, as a result of which the other organs remain intact and remain in their natural position in the slaughtered animal.

Figure 2:
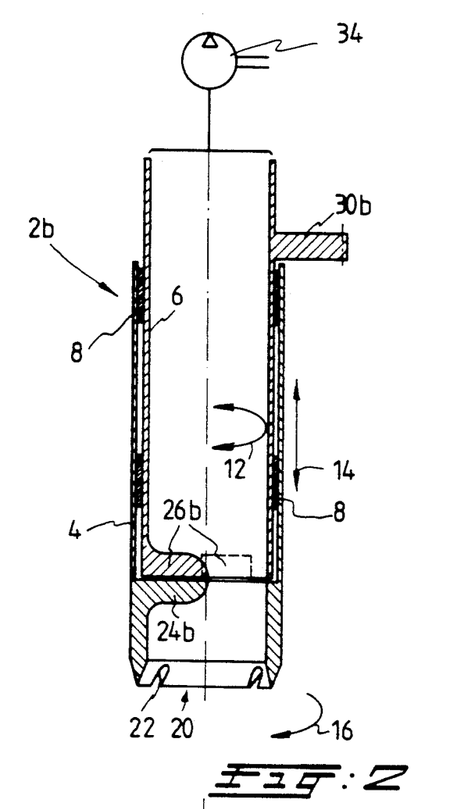
FIG. 2 shows a cross-section of a part of the device according to the invention, in a second embodiment, in longitudinal view.
Figure 4:
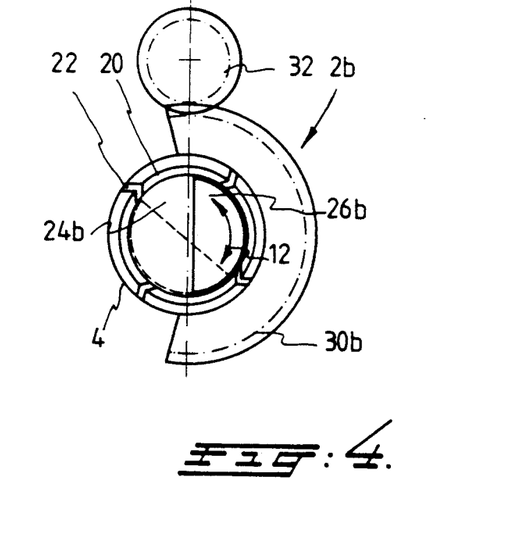
FIG. 4 shows a bottom view of the device according to FIG. 2.

The device which is shown in FIGS. 2 and 4 does not differ in its principles of operation from the one shown in FIGS. 1 and 2. However, in FIGS. 2 and 4 half-moon shaped projections 24b and 26b are used, and the collar 30b consequently takes up only an angle of slightly more than 180°. The projections 24b and 26b in the mandrel 2b shut off slightly more than half of the passage of the mandrel 2b. This embodiment can be used in the case where it is large enough for allowing through the intestines, and has the advantage that a rotary movement of the bush through a smaller angle is possible, with the result that the device can work faster, and the wear on it is less.

Figure 5:
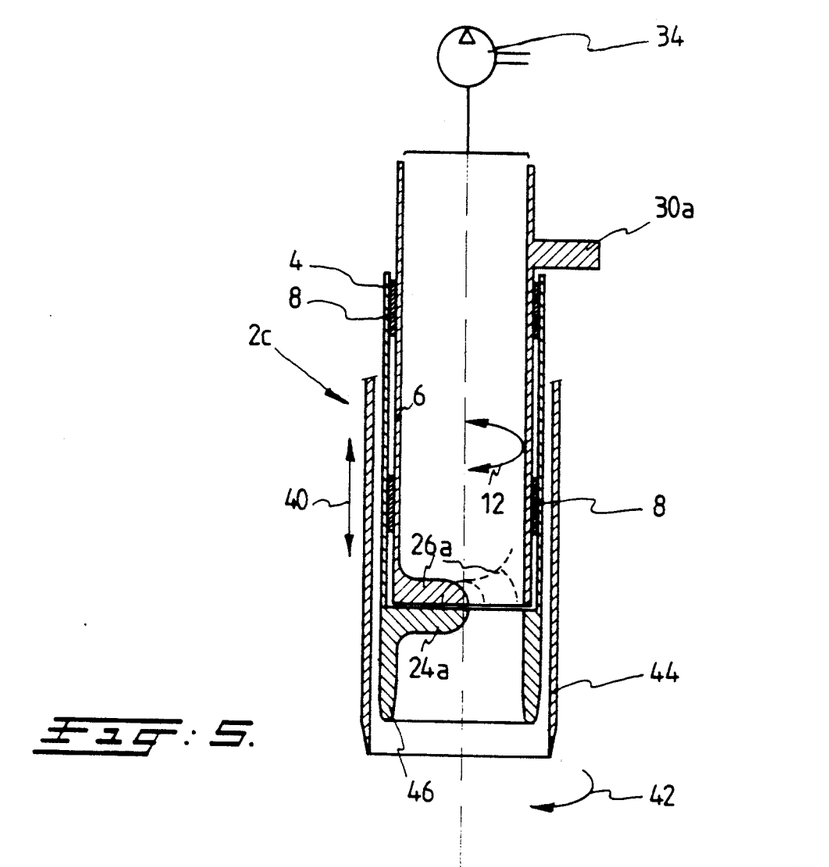
FIG. 5 shows a cross-section of a part of the device according to the invention, in a third embodiment, in longitudinal view.
Figure 6:
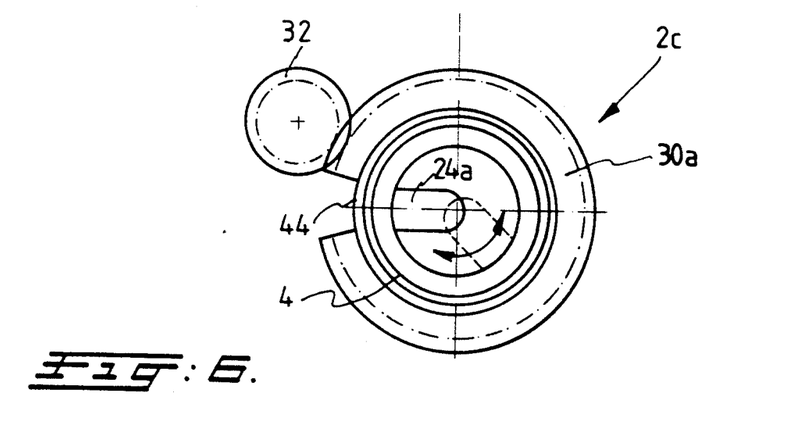
FIG. 6 shows a bottom view of the device according to FIG. 5.

FIGS. 5 and 6 show yet another variant of the device according to the invention, which is most comparable to the embodiment shown in FIGS. 1 and 3 with regard to construction and operation. In the variant shown, the end of the mandrel jacket 4 does not itself have any cutting means, but provision is made for a separate cylindrical cutter 44 which is movable relative to the mandrel in the axial and tangential directions 40, 42 respectively, and which is active only for cutting out the vent, and for this purpose is set in rotation in the position shown in FIG. 5 relative to the mandrel jacket 4, while during the suction of the intestines out of the body cavity of the slaughtered animal the cutter 44 is retracted behind the suction aperture of the mandrel 2c provided with a rounded edge 46. In this way the intestines cannot be damaged by the cutting edge of the cutter 44 during suction of the intestines out of the slaughtered animal.

Various other principles of separating by means of cutting elements are explained with reference to FIGS. 7a–7c, 8a–8c, 9a–9d, and 10a–10e.

Figure 7A:
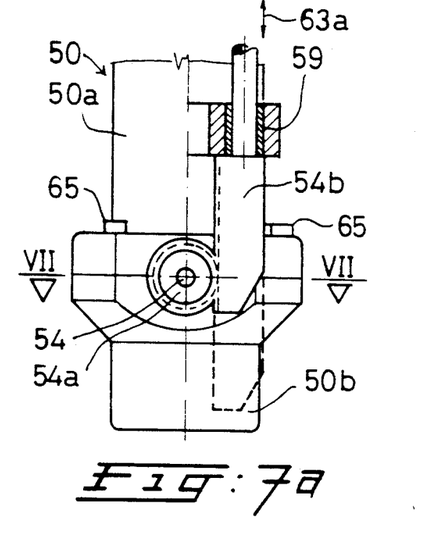
FIG. 7a shows a side view, partially in cross-section, of a separating device according to the invention.
Figure 7B:
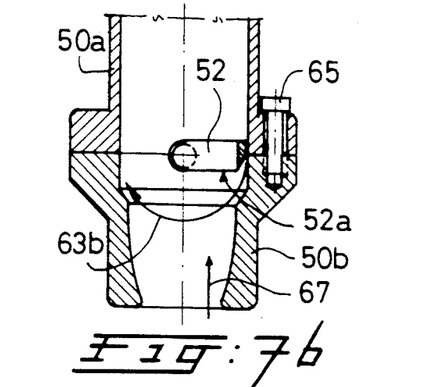
FIG. 7b shows a cross-section of the separating device of FIG. 7a, in longitudinal view.
Figure 7C:
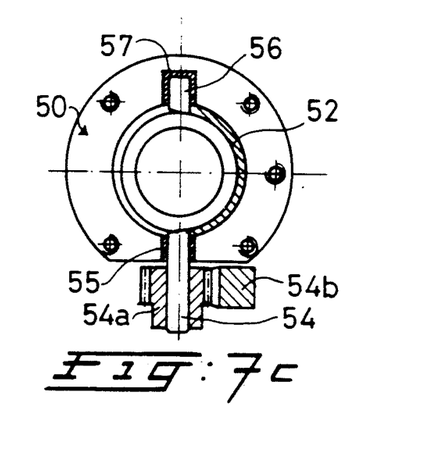
FIG. 7c shows a cross-section of the separating device of FIG. 7a, taken across the plane VII—VII.

In FIGS. 7a, 7b and 7c a bow-shaped cutter 52 is situated in a mandrel 50 along the inner periphery thereof, which cutter can pivot about two shafts 54 and 56 lying diametrically opposite each other and supported in bearings 55 and 57, respectively, in the wall of the mandrel 50. On the shaft 54 a pinion 54a is mounted, which pinion engages with a toothed rack 54b. A slide bearing 59, fixed on the outer surface of the mandrel 50, supports a rod 61 connected to the rack 54b. The rod 61 can be driven by drive means not shown in any further detail in the directions indicated by, double arrow 63a, which will cause the pinion 54a and the bow-shaped cutter 52 connected thereto to pivot in the direction of arrow 63b and back. For easy assembling, the mandrel 50 is divided into an upper part 50a and a lower part 50b, each provided with flanges and connected with bolts 65 to each other.

Driving the shaft 54 in the direction of the arrow 63b through an angle of about 180° causes an active cutting edge 52a of the cutter 52 to move through the zone of the crosssection of the mandrel 50, and in the process it can cut through an organ or a part thereof present in the mandrel 50. In the initial position shown in FIG. 7b the cutter 52 does not impede the passage of an organ through the mandrel 50 in 52 and the reduced inner diameter of the lower part 50b of the mandrel 50.

Figure 8A:
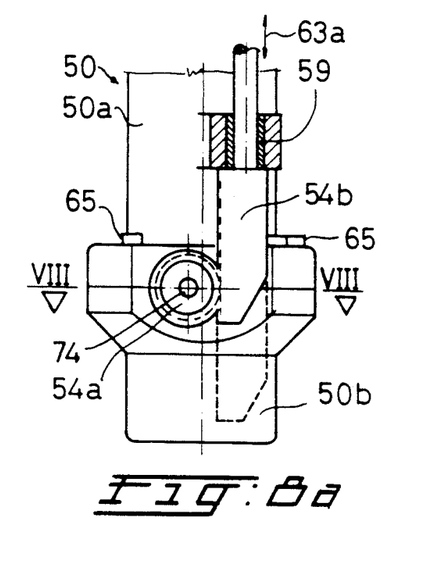
FIG. 8a shows a side view, partially in cross-section, of another separating device according to the invention.
Figure 8B:
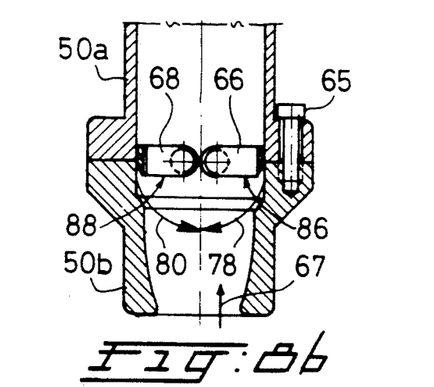
FIG. 8b shows a cross-section of the separating device of FIG. 8a, in longitudinal view.
Figure 8C:
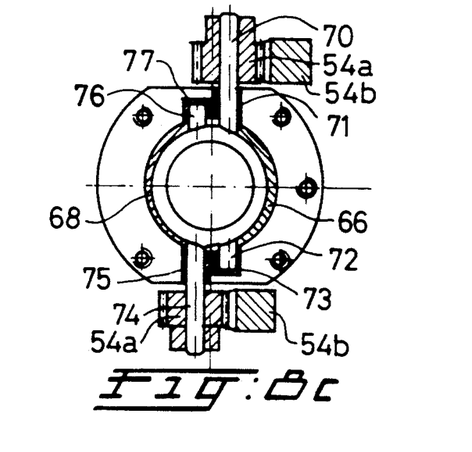
FIG. 8c shows a cross-section of the separating device of FIG. 8a, taken across the plane VIII—VIII.
Figures 9A, 10A:
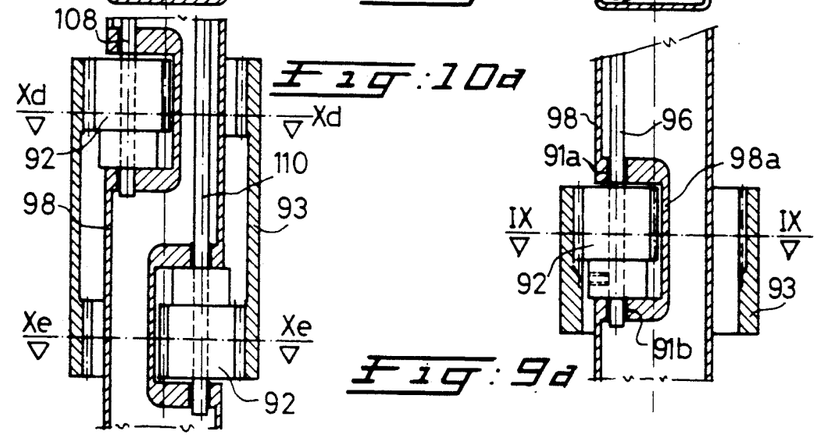
FIG. 9a shows a longitudinal cross-section of a further separating device according to the invention.
FIG. 10a shows a longitudinal cross-section of still another separating device according to the invention.
Figures 9B, 9C, 10B, 10C:
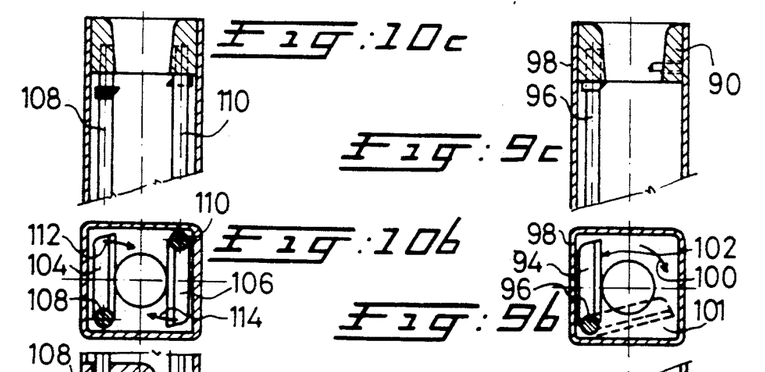
Figures 9D, 10D:
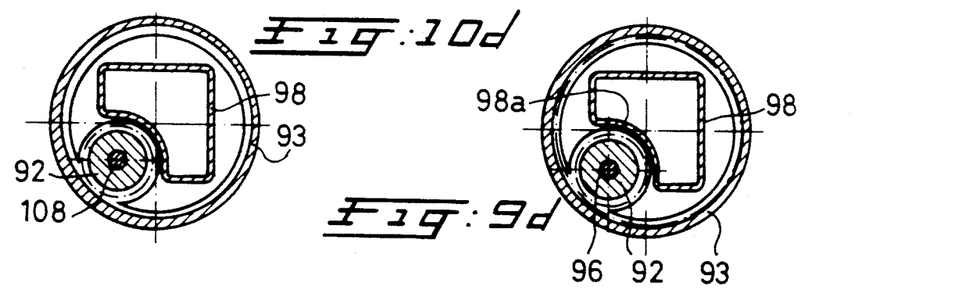
FIG. 9d shows a cross-section of the separating device of FIG. 9a, taken across the plane IX—IX.
FIG. 10d shows a cross-section of the separating device of FIG. 10a, taken across the plane Xd—Xd.
Figure 10E:
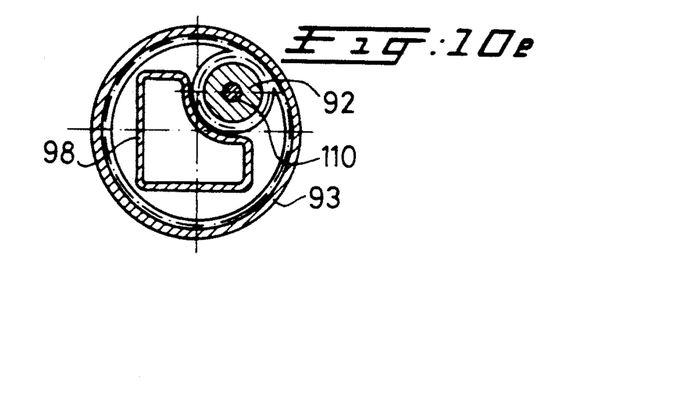
FIG. 10e shows a cross-section of the separating device of FIG. 10a, taken across the plane Xe—Xe.

FIG. 8a–8c show a design of a separating device which is similar to that shown in FIGS. 7a–7c. However, in FIGS. 8a–8c two bow-shaped cutters 66 and 68 are fitted along the inner periphery of the mandrel 50, each of which can pivot about two shafts 70, 72 and 74, 76, respectively, lying essentially diametrically opposite each other in bearings 71, 73, 75 and 77, respectively, in the wall of the mandrel 50. The envisaged separating action is obtained between the cutting edges 86 and 88 of the cutters 66 and 68, respectively, by driving the shafts 70 and 74 in the direction of the arrows 78 and 80, respectively, through an angle of 90°.

Alternatively, the device shown in FIGS. 8a–8c can be designed in such a way that the central axes of the shafts 70, 76 and 72, 74, respectively, coincide.

In FIGS. 9a–9d in a mandrel 98 with an essentially rectangular cross-section a cutter 94 with a cutting edge 102 is fixed on a shaft 96 parallel to the central axis of the mandrel 98. One end of the shaft 96 is supported in a bearing element 90 fitted on the inner periphery of the mandrel 98, while at the other end the shaft 96 is supported in bearings 91a and 91b provided in a part 98a of the mandrel 98 protruding inwardly. The cutter 94 can pivot, as indicated with arrow 100, through an angle of about 90° by fixing a pinion 92 on the shaft 96 at the protruding part 98a of the mandrel 98, and driving the pinion 92 with an internal gear 93. The active cutting edge 102 can in the process cut through an organ situated in the mandrel 98. Upstream in the mandrel 98, as seen in the direction of conveyance of organs in the mandrel, an inner diameter reducing element 101 is provided to avoid any undesired contact between the cutter 94 or the cutting edge 102 thereof and an organ passing through the mandrel 98.

FIGS. 10a-10e show a design of a separating device which is similar to that shown in FIGS. 9a-9d, but in FIGS. 10a-10e two cutters 104 and 106 are disposed diametrically opposite each other. The envisaged cutting action is obtained by driving the shafts 108 and 110 with the internal gear 93 and the pinions 92 in the direction of the arrows 112, 114, respectively, through an angle of about 45°-90°.

Figure 11A:
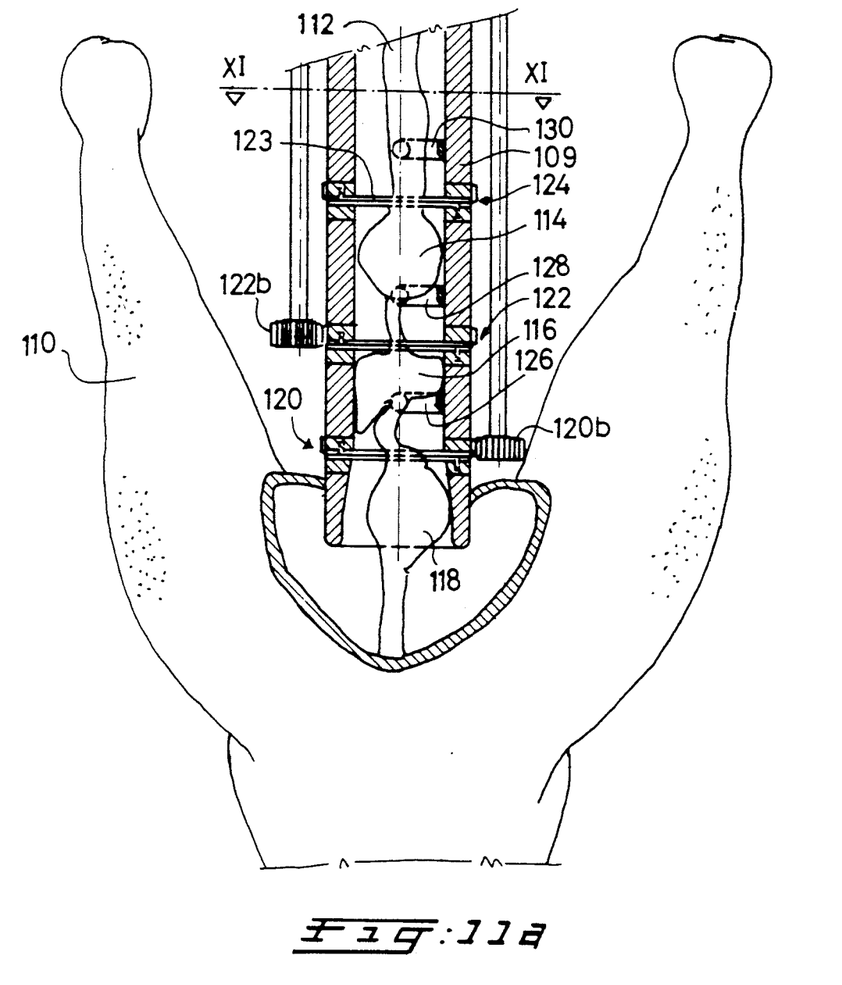
FIG. 11a shows a longitudinal cross-section of a part of the device according o the invention during the selective removal of organs from a bird shown schematically.
Figure 11B:
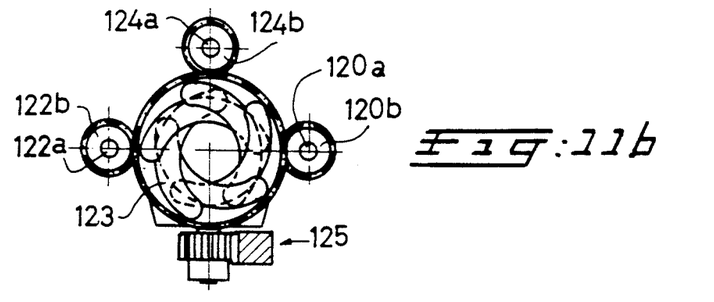
FIG. 11b shows a cross-section of the device of FIG. 11a, taken across a plane XI—XI.

FIGS. 11a-11b show an organ removal device, comprising a mandrel 109, of which one open end is inserted into the belly cavity of a bird 110, from which belly cavity organs 112, 114, 116 and 118 are removed, for example sucked out by means of a vacuum source (not shown). The mandrel 109 comprises adjustable passing means 120, 122 and 124 lying at predetermined distances after one another, in the form of iris diaphragms, each of which determines a passage which is matched in such a way to the dimensions of the organ lying against it that the latter cannot pass the passing means in question. Fitted behind each of the passing means 120, 122 and 124 are separating means 126, 128 and 130 respectively. These separating means are designed like the cutting element 52 in FIGS. 7b and 7c, but may alternatively comprise cutters like 24a and 26a, 24b and 26b, 66 and 68, 94 or 104 and 106, which have been described above with reference to the respective FIGS. 1-6, 8a-8c, 9a-9d and 10a-10e.

Each iris diaphragm 120, 122 and 124 comprises a shaft 120a, 122a and 124a, respectively, with a pinion 120b, 122b and 124b fixed to one end thereof for driving an external gear causing the lamellae of the iris-diaphragm (e.g. lamellae 123 of iris diaphragm 124) to pivot to and from the central axis of the mandrel 109. Thus in a very simple way an organ feed aperture can be set by rotating a shaft corresponding to an iris diaphragm. FIG. 11b further shows drive means 125 for the cutters 126, 128 and 130. These drive means correspond with the rack and pinion drive means shown in FIGS. 7a-7c and 8a-8c.

Figure 12:
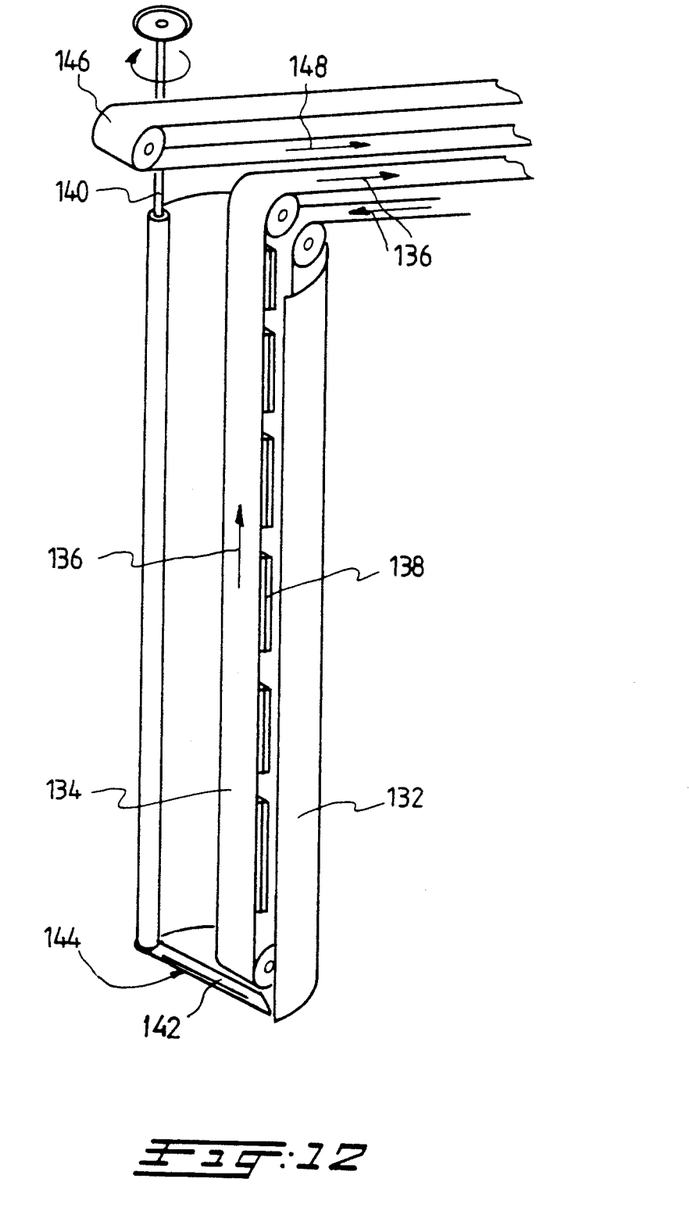
FIG. 12 shows a schematically cut-away view in perspective of a part of a device according to the invention, in a further embodiment.

FIG. 12 shows a half cylinder 132, on the inside of which a mechanical organ conveyance device in the form of a conveyor belt 134 can be driven in the direction of arrow 136. Resilient supports 138 are fitted below the conveyor belt 134. If a second half cylinder is placed opposite the half cylinder 132, and also provided with a conveyor belt, in such a way that the two cylinder halves together approximately form a full cylinder, organs can be moved in the cylinder by means of the conveyor belts. A cutter 142 with a cutting edge 144 fitted on one end of the cylinder, and pivotable about a shaft 140, can separate an organ lying in the cylinder from organs lying outside the cylinder.

For the further discharge of separated organs, provision is made for a second conveyor belt 146, which can be driven in the direction of arrow 148. The conveyor belt 146 can in this case interact with a part of conveyor belt 134 running parallel thereto.

Figure 13:
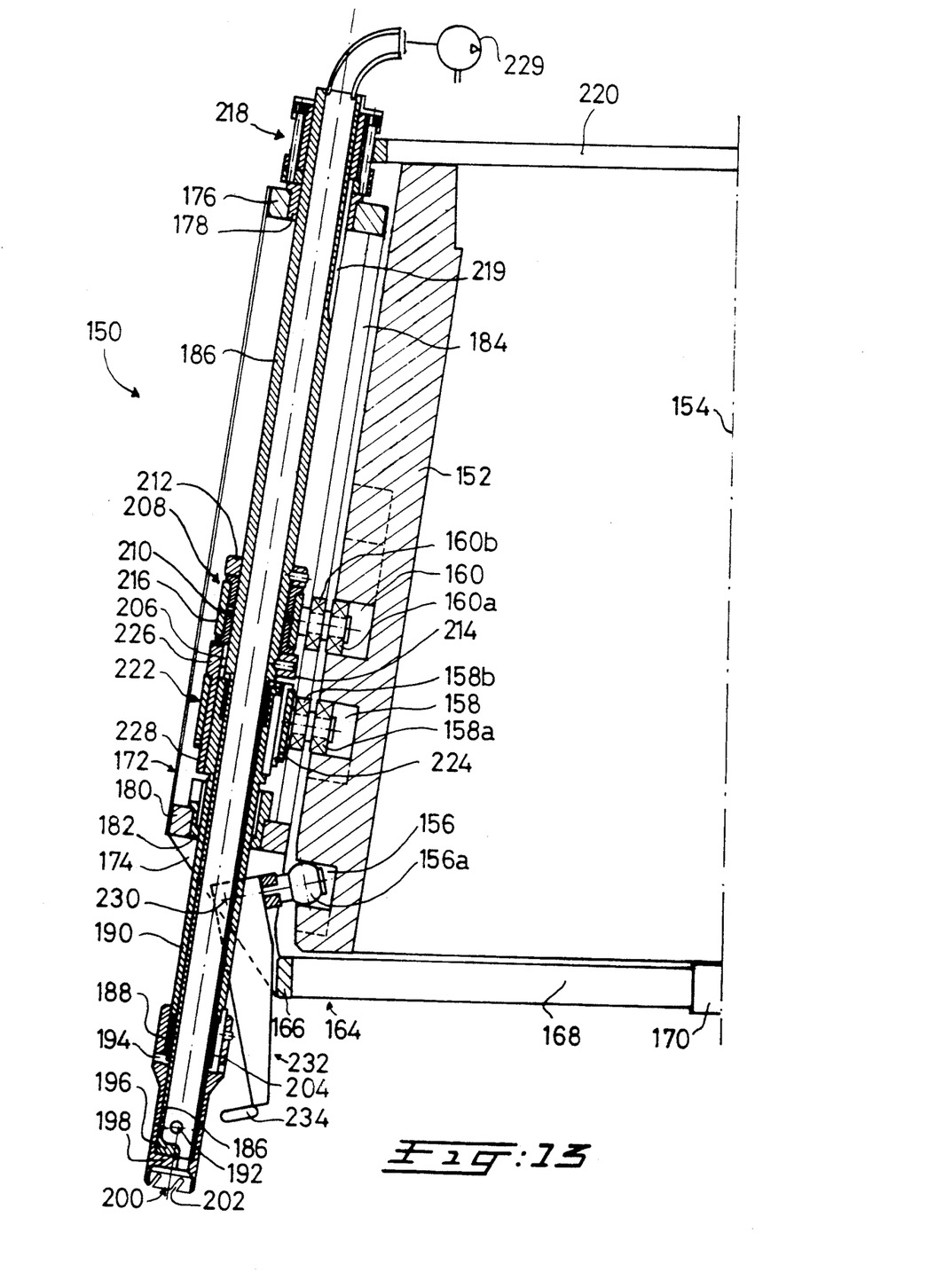
FIG. 13 shows a longitudinal cross-section of a part of an installation according to the invention.

FIG. 13 shows a part of an installation comprising a plurality of devices 150 according to the invention. The installation contains a fixed conical drum 152 having a central axis 154. In the outer surface of the drum 152 closed curved tracks 156, 158 and 160 are provided for operating different elements of the devices 150 rotating around the drum 152 by means of respective follow-on wheels 156a, 158a and 160a connected to said elements. The vertical area in which the curved tracks 156, 158 and 160 extend, is indicated with dashed lines. In FIG. 13, a conveyor in which slaughtered animals are being moved along hanging by the legs in hooks in and out the operational area of the devices 150, wherein the peripheral speed of the devices 150 is essentially equal to the conveyance speed of the conveyor, is not shown for clarity.

Each device 150 of the installation is fixed to a cage structure 164 comprising a ring 166 mounted on spokes 168 which extend to a hub 170 located on the axis 154 of the installation. On the ring 166 at regular intervals in the peripheral direction a number of device frames 172 is fixed with connecting plates 174. Each device frame 172 has an upper frame flange 176 with a slide bearing 178 and a lower frame flange 180 with a slide bearing 182. Two guide rails 184, only one of which is visible in FIG. 13, extending between the upper frame flange 176 and the lower frame flange 180, guide the elements of the device 150 connected to the follow-on wheels 158a and 160a in a vertical direction parallel to the surface of the drum 152 with respective second guide wheels 158b and 160b mounted rotatably on the same respective shaft as said follow-on wheels are mounted.

The device 150 comprises an inner tube 186, a lower outer tube 188 and an upper outer tube 190. Both the inner tube 186 and the lower outer tube 188 are provided with a plurality of apertures 192 and 194, respectively, which, together with a radial gap between the inner tube 186 and the lower outer tube 188 form a channel connecting the interior space of the inner tube 186 to the atmosphere. At the end of the lower outer tube 188 facing away from the upper outer tube 190 two cutting elements 196, 198 projecting in the radial direction are provided, as well as a cutting edge 200 provided with notches 202. This part of the device 150 corresponds with the device shown in FIGS. 1 and 3. The organ feed aperture defined by the cutting edge 200 is large enough for the intestines of a slaughtered animal to pass, but not for the stomach connected to the intestines.

The upper outer tube 190 is fixed to the lower outer tube 188 near the apertures 194. The two outer tubes 188 and 190 are fixed to the inner tube 186 in the axial direction, but the inner tube 186 can be rotated relative to the two outer tubes 188 and 190 as will be explained later. For this purpose, bearings 204 and 206 are provided.

The assembly of the inner tube 186 and the two outer tubes 188 and 190 can be moved in the axial direction by the element 208 operated by curved track 160 and follow-on wheels 160a and 160b. Te element 208 consists of a bearing sleeve 210, in the axial direction fixed between an upper ring 212 and a lower ring 214. The rings 212 and 214 are fixed to the inner tube 186. The bearing sleeve 210 is enclosed by a ring 216 connected to the shaft on which the wheels 160a and 160b are mounted.

The inner tube 186 can be rotated by moving a cog wheel 218 keyed thereto in key way 219 along an appropriate outer toothed ring 220 fixed to the drum 152. On rotation of the inner tube 186 the two outer tubes 188 and 190 may or may not rotate also, depending on the axial position of a coupling element 222. The coupling element 222 comprises a sleeve 224 connected to the shaft on which the follow-on wheel 158a and the guide wheel 158b are mounted. In the position shown in FIG. 13 and determined by the curved track 158, a projection 226 projecting axially into a notch in the lower ring 214, mechanically couples the inner tube 186 to the two outer tubes 188 and 190 in the tangential direction, which means that the tubes 186, 188 and 190 will rotate jointly when the inner tube 186 is driven by cog wheel 218 engaging toothed ring 220. In a lower position of the coupling element 222, indicated by the dashed line of the curved track 158, the coupling element 222 with a projection 228 then projecting axially into a notch in the lower frame flange 180, mechanically couples the two outer tubes 188 and 190 to the device frame 172, so that only the inner tube 186 will rotate when the inner tube 186 is driven by cog Wheel 218 engaging toothed ring 220.

The inner tube 186 is connected to a vacuum system, symbolically indicated with a vacuum pump 229.

Finally, follow-on wheel 156a in curved track 156, by pivoting on an axis 230, can move a stop element 232 with a bow 234 to and from the region of the lower outer tube 188.

In operation, a slaughtered bird is positioned hanging by the legs from a hook below the cutting edge 200 of the device 150. By guiding the follow-on wheel 160a in the curved track 160 to the position shown in FIG. 13, simultaneously driving the cog wheel 218 for causing the inner tube 186 to rotate, coupling the inner tube 186 to the two outer tubes 188 and 190 with the coupling element 222, and applying a vacuum to the inner tube 186, the vent is cut out, following which the rotation of the cog wheel 218 is stopped, and the intestines are sucked into the mandrel formed by the inner and outer tubes 186, 188 and 190. The stop element 232 prevents the slaughtered animal to move towards the device !50 during this processing. After sufficient time has elapsed for the stomach connected to the intestines to reach the cutting edge 200 and stop the conveyance of the intestines through the mandrel, or if this condition is established with other sensing means, e.g. pressure sensing means, the coupling element 222 is shifted to the lower position thereof by guiding the corresponding follow-on wheel 158a in the curved track 158 downwards, whereby the tangential position of the two outer tubes 188 and 190 is fixed. Next, the cog wheel 2!8 is driven again by the toothed ring 220, resulting in the cutting element 196 being rotated relative to the cutting element 198. Thus, the intestines are separated from the stomach, and the intestines are sucked further into the mandrel and collected in the vacuum system. The vacuum system is then shut off, releasing the stomach from the lower outer tube 188, and the inner and outer tubes 186, 188 and 190 are retracted from the slaughtered animal. A next animal can be processed after this, repeating the operational sequence described before.

While the invention has been described and illustrated in its preferred embodiments, it should be understood that departures may be made therefrom within the scope of the invention, which is not limited to the details disclosed herein. With the disclosed principles a person skilled in the art will be able to design an optimum device for his purposes, e.g. through modification of the embodiment of FIG. 13 by including features described in conjunction with FIGS. 2 and 4, 5, 7a–7c, 8a–8c, 9a–9d, 10a–10e, 11a–11b or 12.

What is claimed is:

1. A device for removing one or more organs or parts thereof from a slaughtered animal, in particular a bird, comprising:

organ guide means with an open organ feed end to be inserted temporarily into the body cavity of the slaughtered animal for guiding the one or more organs or parts thereof from the body cavity of the slaughtered animal through the feed end and out of the body cavity of the slaughtered animal;

organ conveyance means acting in part within said organ guide means for moving the one or more organs or parts thereof along the organ guide means;

separating means which are fitted near the organ feed end or along the organ guide means for making a separation in the one or more organs or parts thereof or the connecting tissue between them at a selected predetermined place, each of the one or more organs or parts thereof being separated off from the slaughtered animal by said separating means and are thereafter removed from the body cavity of the slaughtered animal by said organ conveyance means along the organ guide means; and means located proximate to said organ guide means for establishing the position of the organs relative to the separating means for determining the place of separation.

2. A device according to claim 1, wherein the separating means comprise shearing means, cutting means or pinch-off means.

3. A device according to claim 1, wherein the means for establishing the position of organs are fitted at the open organ feed end of the organ guide means and comprise an organ feed aperture with such dimensions that first organs can pass said aperture and second organs connected to the first organs cannot pass said aperture.

4. A device according to claim 3, comprising passing means for setting the dimensions of the organ feed aperture.

5. A device according to claim 4, wherein the passing means comprise an iris diaphragm.

6. A device according to claim 1, wherein the organ guide means comprises a number of separating means placed one after the other at predetermined distances in the direction of removal of the organs.

7. A device according to claim 3, wherein the organ guide means comprise a number of sets of organ feed apertures and separating means placed one after the other at predetermined distances in the direction of removal of the organs.

8. A device according to claim 1, wherein the organs can be conveyed in a hollow mandrel by means of an air flow produced by a vacuum source and directed from an organ feed aperture into the mandrel, provision being made for channels of which one open end opens out outside the slaughtered animal and the other open end opens out in the mandrel near the organ feed aperture thereof.

9. A device according to claim 1, wherein the separating means comprise an elongated cutting element which pivots about a line parallel to the central axis of the organ guide means.

10. A device according to claim 8, wherein the mandrel is cylindrical surface shaped, and the separating means comprise a first and a second cutting element which extend essentially from the inside wall of the mandrel in the radial direction at least up to the axis of the mandrel and directly adjoin each other in the axial direction, each of them shutting off a part of the cross-section of the hollow space inside the mandrel and being capable of pivoting relative to each other about the central axis of the mandrel.

11. A device according to claim 10, wherein one of the two cutting elements is fixed to the mandrel, and the other cutting element is fixed to a bush which is rotatable coaxially inside the mandrel.

12. A device according to claim 8, wherein the separating means comprise a bow-shaped cutting element extending along a part of the inner periphery of the mandrel between two pivot points lying essentially diametrically opposite each other, and pivotable about a line through the pivot points at right angles to the central axis of the mandrel.

13. A device according to claim 12, comprising two bow-shaped cutting elements which are fitted diametrically opposite each other in the mandrel, the respective pivot points of said cutting elements coinciding or lying adjacent to each other.

14. A device according to claim 1, wherein the organ feed end is provided with an annular cutting edge operative in the axial direction, and in that at least the organ feed end of the organ guide means can be driven rotatably.

15. A device according to claim 14, wherein the cutting edge is provided with a number of radial notches provided at an acute angle with the central axis of the organ guide means, the side of each notch which forms an obtuse angle with the cutting edge lying in the direction of rotation of the cutting edge.

16. A device according to claim 1, wherein fitted coaxially outside the organ guide means is a cutter which is movable in the axial direction relative to the organ feed end and can be driven rotatably, and which has an annular cutting edge operating in the axial direction.

17. A device according to claim 16, wherein the cutting edge is provided with a number of radial notches provided at an acute angle with the central axis of the organ guide means, the side of each notch which forms an obtuse angle with the cutting edge line in the direction of rotation of the cutting edge.

18. An installation for selectively removing organs from slaughtered animals, in particular birds, comprising a number of devices according to claim 1, the installation being disposed along a conveyor in which the slaughtered animals are being moved along hanging by the legs in hooks, which installation comprises a fixed, essentially cylindrical or conical drum, in the outer surface of which curved tracks are provided for controlling, by means of follow-on wheels guided in the curved tracks, the movement of the organ guide means, the organ conveyance means, the separating means and the passing means of devices to be rotated around the drum, the peripheral speed of the devices being essentially equal to the conveyance speed of the conveyor.

* * * * *